Jan. 26, 1926.  1,570,888

A. W. GRAY

DIRIGIBLE HEADLIGHT

Filed Feb. 4, 1925

Inventor
A. W. Gray
By Clarence O'Brien
Attorney

Patented Jan. 26, 1926.

1,570,888

UNITED STATES PATENT OFFICE.

ARTHUR W. GRAY, OF PUEBLO, COLORADO.

DIRIGIBLE HEADLIGHT.

Application filed February 4, 1925. Serial No. 6,745.

*To all whom it may concern:*

Be it known that I, ARTHUR W. GRAY, a citizen of the United States, residing at Pueblo, in the county of Pueblo and State of Colorado, have invented certain new and useful Improvements in a Dirigible Headlight, of which the following is a specification.

This invention relates to improvements in headlights for use upon motor vehicles, and has for its primary object to provide means whereby the headlight is adapted for universal movement on the front of the motor vehicle.

One of the important objects of the present invention is to provide a dirigible headlight, wherein the same is adapted to be controlled in its various adjusted positions at a point remote therefrom, the headlight being adapted to be secured on the front of the motor vehicle, the operating means therefor being disposed within easy access of the operator of the motor vehicle.

A further object of the invention is to provide a dirigible headlight of the above mentioned character, which may be readily and easily secured in position upon a motor vehicle, means being further associated therewith for normally holding the headlights in such a manner as the rays of light therefrom will be directed forwardly.

A further object of the invention is to provide a dirigible headlight of the above mentioned character, wherein a visor is associated therewith for the purpose of preventing the glare of the headlight from blinding the driver of an approachable vehicle.

A further object of the invention is to provide a dirigible headlight of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1:
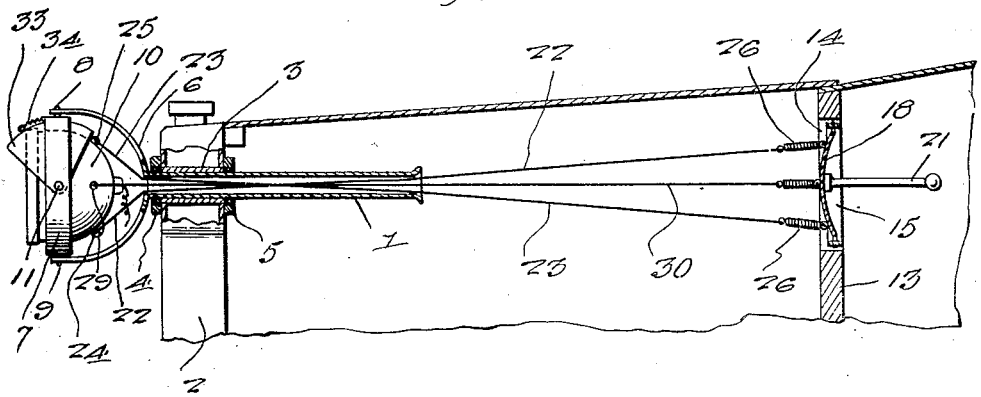
Figure 1 is a view partly in side elevation and partly in section of the device embodying my invention, showing the same mounted upon a motor vehicle.
Figure 2:
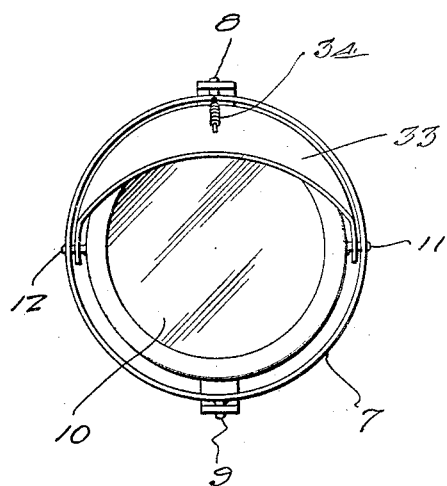
Figure 2 is a front elevation of the headlight and the mounting therefor.
Figure 3:
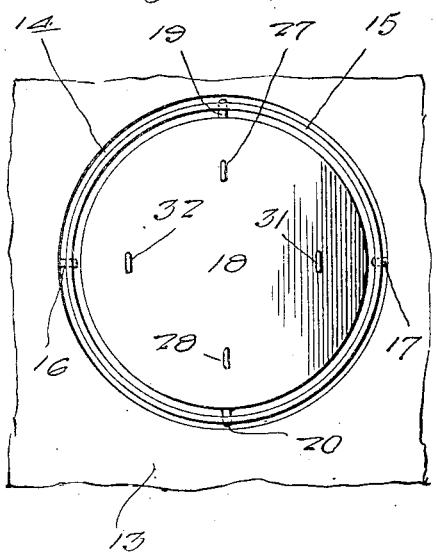
Figure 3 is an elevational view of the disc and the mounting therefor.

In the drawing wherein for the purpose of illustration is shown the preferred embodiment of my invention, the numeral 1 designates an elongated tube which has its forward end extending transversely through a suitable opening provided therefor in the upper portion of the radiator 2 of the motor vehicle, a bushing or sleeve 3 being disposed within the opening in the radiator and cooperating with the tube in the manner clearly illustrated in Figure 1. Lock nuts 4 and 5 respectively are threaded on the forward portion of the tube 1 and are disposed on the opposite sides of the radiator for securing the tube against displacement and further to prevent the leakage of water from the radiator. It being understood of course that any suitable packing may be associated therewith.

A vertically disposed yoke 6 is formed on the forward end of the tube 1. A ring 7 is provided with a pair of diametrically opposed pivot pins 8 and 9 respectively which are receivable within suitable openings provided in the free ends of the upper and lower arms of the vertically disposed yoke 6 so that the ring 7 may rotate on a vertical axis within the yoke.

A headlight of any well known construction is indicated at 10 and the same has extending from diametrically opposite points the pivot pins 11 and 12 respectively, the same being adapted to be received in suitable openings provided therefor in diametrically opposed portions of the ring 7, the same being located at substantially right angles to the openings in the arms of the yoke 6 and the pivot pins supported therein whereby the headlight 10 is adapted to rotate in the ring 7 on a horizontal axis.

The dash board of the motor vehicle is indicated at 13 and the same is provided with an enlarged opening 14. A ring 15 is pivotally supported within the opening 14 by means of the pivot pins 16 and 17 which extend inwardly at diametrically opposite points in the opening of the dash board and these pivot pins are received through suitable openings provided therefor in the ring 15, whereby the ring is adapted to swing or rotate on a horizontal axis. A substantially concaved disc 18 is disposed within the ring 15 and is provided with a pair of diametrically opposed pivot pins 19 and 20, the same being received within the suitable openings provided within the ring 15, the openings for receiving the pivot pins 19 and 20 being disposed at substantially right angles to the openings provided for receiving the pivot pins 16 and 17 whereby the disc 18 will rotate within the ring 15 on a vertical axis. The concaved face of the disc has secured thereto the rearwardly extending handles 20 and the purpose thereof will hereinafter be more fully described.

The operating cables associated with the headlights are adapted to extend through the tube 1 and are crossed therein in the manner illustrated in Figure 1. One pair of cables 22 and 23 respectively are secured to the bottom and top of the rear portion of the headlight as illustrated at 24 and 25 respectively, the connections 24 and 25 being in alignment with the pivot pins 8 and 9. The opposite ends of the cables 22 and 23 have associated therewith the coil springs 26 and the latter are detachably associated with the eyes 27 and 28 which are secured on the convex face of the disc 18, the same being disposed in alignment with the pivot pins 19 and 20.

Secured to each of the sides of the rear portion of the headlights by means of the connection 29 is the cable 30. Each of the side cables is connected at its rear end to a coil spring similar to the aforementioned coil springs and the coil springs on the ends of the respective side cables 30 are detachably associated with the eyes 31 and 32 respective to the disc 18, the eyes 31 and 32 being arranged in alignment with the pivot pins 16 and 17.

It is obvious from the construction shown and above described that when the operator actuates the handles 21 in one direction, that is to say the handle 21 is moved in a horizontal plane in either direction, the headlights 10 will be caused to swing on the pivot pins 8 and 9 which are associated with the ring 7 to the right or left depending upon the direction in which the handle 21 has been moved so that the rays of light from the headlights may be directed to either side of the motor vehicle. The headlight is further adapted to be tilted upwardly or downwardly by moving the handle 21 in a vertical plane whereby the disc 18 and the ring 15 will swing on the pivot pins 16 and 17 and through the medium of the cables 22 and 23, the headlight 10 will swing on the pivot pins 11 and 12 and in either an upward or downward position, depending upon the position in which the handle 21 has been moved so that the rays of light may be directed upwardly or downwardly.

In order to prevent the glare from the headlights 10 blinding an approaching driver, a visor 33 is pivotally supported on the pivot pins 11 and 12 and is disposed over the upper portion of the headlight, the rear end thereof engaging the connection 25. When the headlight is tilted downwardly, the connection 25 will cause the visor 33 to swing on its pivot in its downward direction simultaneous with the downward tilting of the headlight thus causing the rays of light from the headlight 10 to be directed downwardly onto the road. A coil spring 34 is associated with the visor and the ring 7 for normally holding the same in the position shown in Figure 1.

The coil springs associated with the rear ends of the cables and the discs 18 will return the various parts to their normal positions when the handle 21 is released, thereby rendering the operation of the headlights positive at all times.

It will thus be seen from the foregoing description, that a dirigible headlight has been provided for use upon motor vehicles, which is of such construction as to enable the same to be moved in any direction, the operating means therefor being disposed within easy access of the driver of the motor vehicle. Furthermore, the construction of my improved headlight is such as to enable the same to be readily and easily secured in position upon a motor vehicle without necessitating any material alterations of the parts of the motor vehicle with which the same is associated.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A dirigible headlight comprising in combination with the radiator and dash board of a motor vehicle, a tube extending transversely through the radiator, a yoke on the outer end of said tube, a ring pivotally supported in said yoke and adapted to rotate on a vertical axis, a headlight pivotally supported in said ring at right angles to the aforementioned pivot adapted to rotate on a horizontal axis, cables secured at predetermined points to the headlights and extending through said tube, means on said dash board connected to the opposite ends of said cables for moving said headlights on said vertical and horizontal pivots independently, said means comprising a disc, and a ring, said disc and said ring being disposed within an opening provided therefor in said dash board, said ring being adapted to rotate on a vertical axis in said openings, the disc being adapted to rotate on a horizontal axis in said ring, a handle associated with said disc, and resilient means associated with the rear ends of the cables and said disc for returning the headlight to its normal position.

In testimony whereof I affix my signature.

ARTHUR W. GRAY.